G. J. MURPHY.
SPRING WHEEL.
APPLICATION FILED MAR. 18, 1915.
1,147,534.
Patented July 20, 1915.
4 SHEETS—SHEET 3.
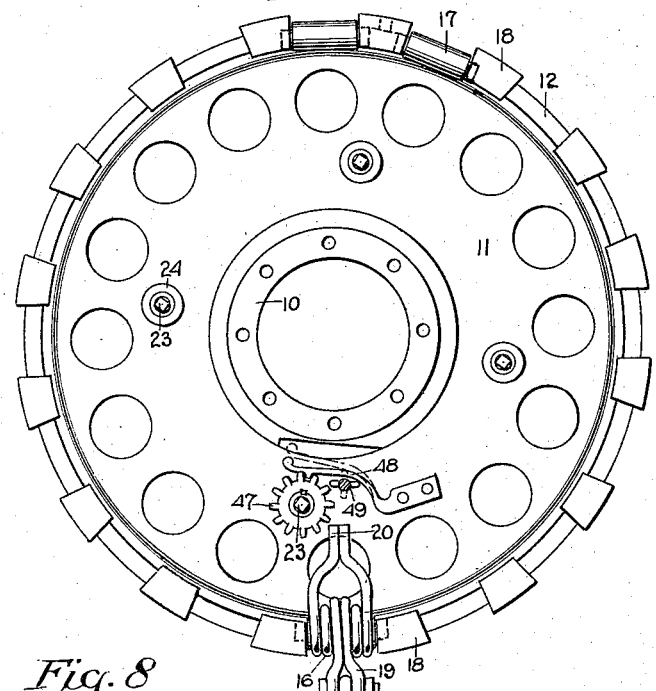
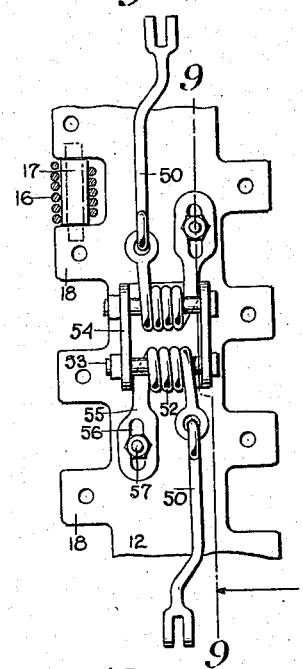
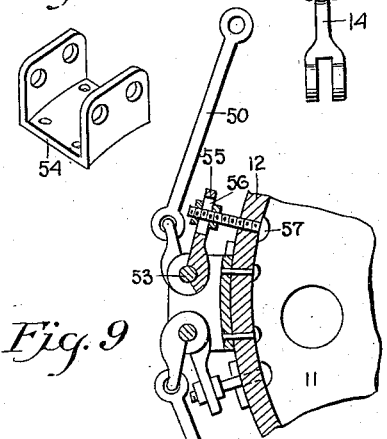
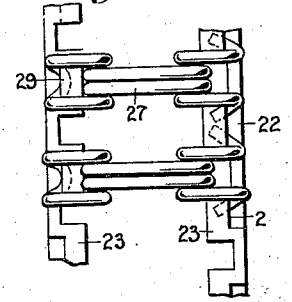
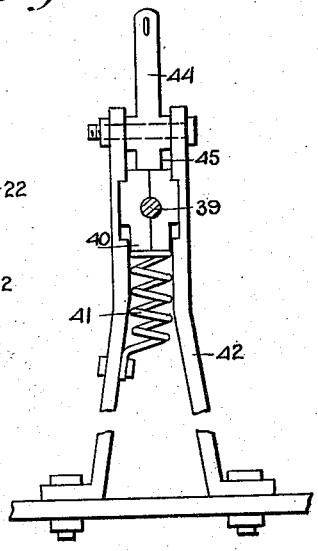
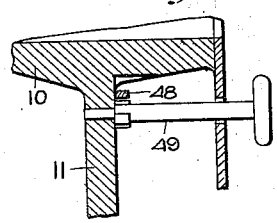
WITNESSES:
INVENTOR
George Joseph Murphy
BY
ATTORNEYS G. J. MURPHY.
SPRING WHEEL.
APPLICATION FILED MAR. 18, 1915.
1,147,534.
Patented July 20, 1915.
4 SHEETS—SHEET 4.
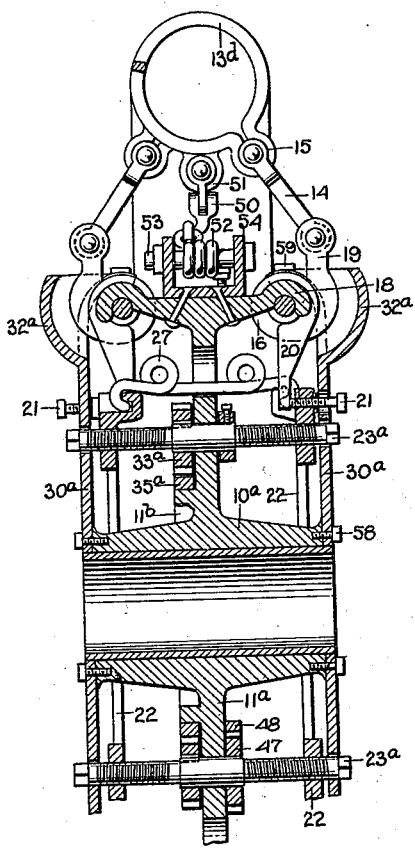
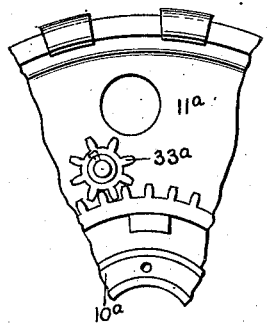
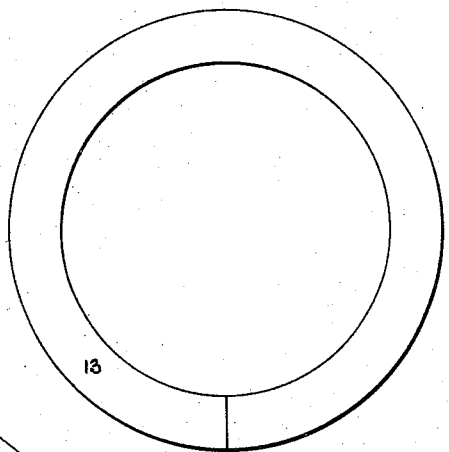
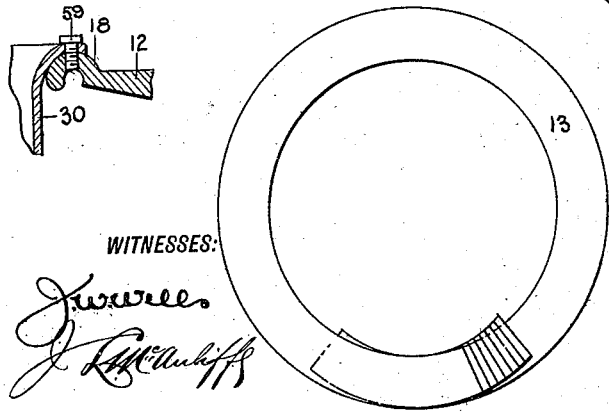
INVENTOR
George Joseph Murphy
BY
ATTORNEYS

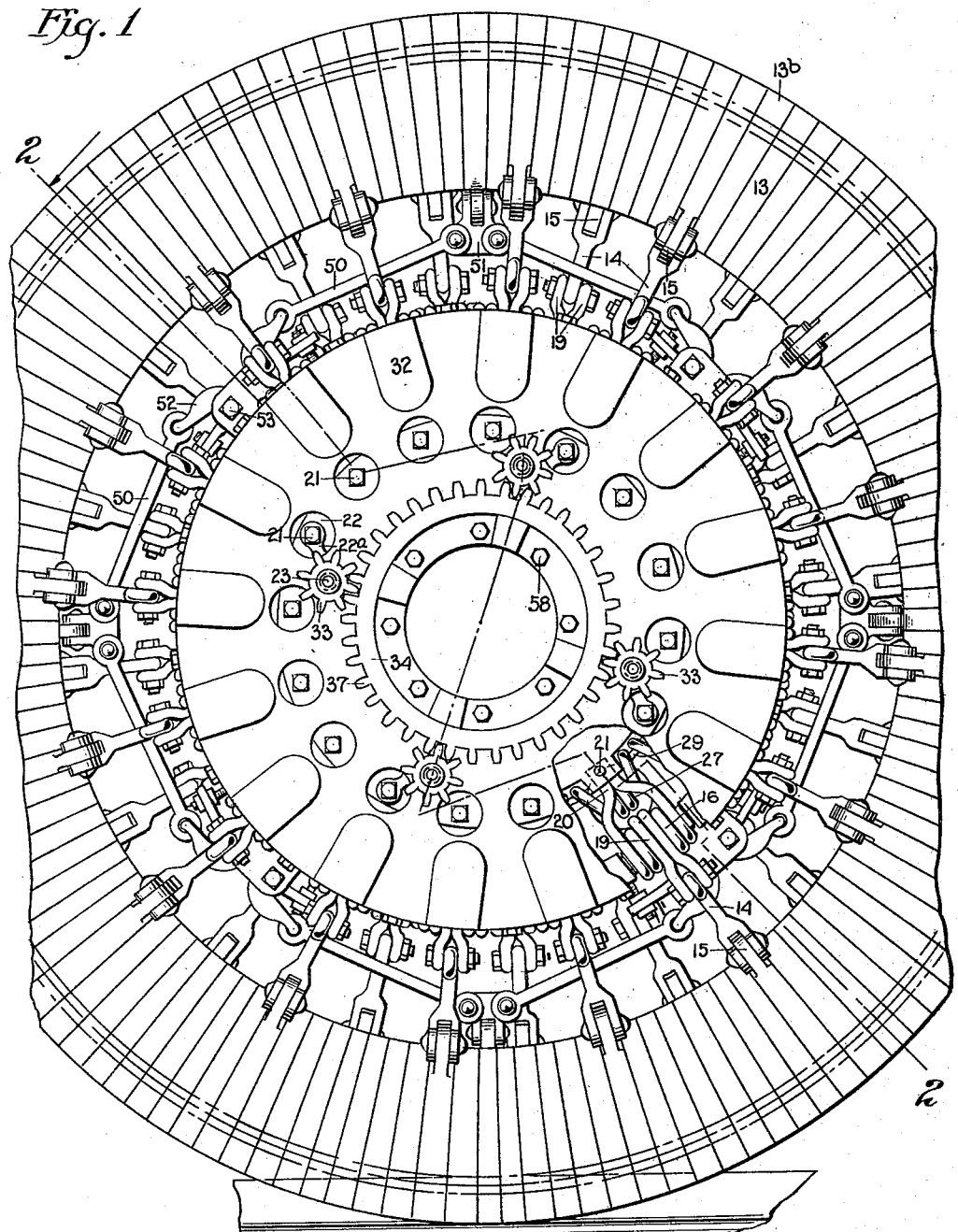

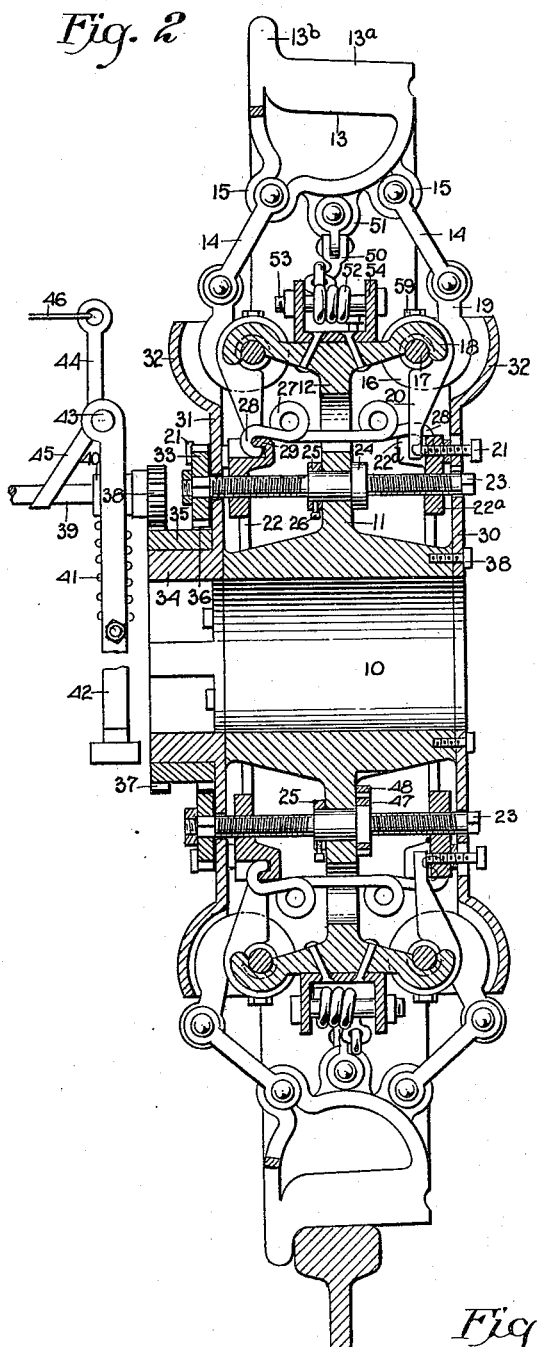

UNITED STATES PATENT OFFICE.

GEORGE JOSEPH MURPHY, OF BUENOS AIRES, ARGENTINA.

SPRING-WHEEL.

1,147,534.  Specification of Letters Patent.  Patented July 20, 1915.

Application filed March 18, 1915. Serial No. 15,180.

*To all whom it may concern:*

Be it known that I, GEORGE JOSEPH MURPHY, a subject of the King of Great Britain, and a resident of Baradero, F. C. C. A., Buenos Aires, Argentina, have invented a new and Improved Spring-Wheel, of which the following is a full, clear, and exact description.

Objects of my invention are to provide in a spring wheel employing resilient spokes and resilient stays, novel and improved means for varying the tension of the spokes and stays; to provide a spring wheel in which the resilient elements are so arranged that the shock will be absorbed throughout the entire wheel; and to provide a wheel, certain features of which are particularly adapted for embodiment in a car wheel whereby to reduce wear and tear on the railway track and rolling stock.

Other objects and advantages of the invention will appear from the specific description following.

Figure 1 is a broken side elevation of a car wheel embodying my invention looking from the left of Fig. 2, certain parts shown in the latter figure being omitted in Fig. 1; Fig. 2 is a transverse section on the line 2—2, Fig. 1; Fig. 3 is an outer face view of a ring entering into the construction of the wheel, and to be hereinafter referred to; Fig. 4 is a view of the opposite side of the ring shown in Fig. 3; Fig. 5 is a detail section on line 5—5 Fig. 4; Fig. 6 is a detail side view of the hub section of the wheel, together with a spoke and its appurtenances, the view also showing details to be hereinafter referred to; Fig. 7 is a fragmentary detail view of the hub section, the view showing also resilient stays; Fig. 8 is a perspective view of a bracket to secure the inner ends of the stays shown in Fig. 7; Fig. 9 is a detail section on the line 9—9 Fig. 7; Fig. 10 is a fragmentary edge view showing two of the rings shown in Figs. 3 and 4, together with tie springs associated therewith; Figs. 11 and 12 are details hereinafter referred to; Fig. 13 is a fragmentary transverse section showing the invention embodied in the wheel of a road vehicle; Fig. 14 is a fragmentary detail of the wheel shown in Fig. 13; Fig. 15 is a detail section showing the method of securing the housing plates; Fig. 16 is a diagrammatic end view given to illustrate the coil spring forming the tire section prior to being bent into ring form; and Fig. 17 is a view similar to Fig. 16 showing the coil expanded and the ends joined.

In constructing a practical embodiment of my invention, a hub section 10 is provided, having a radial web 11 formed with a rim 12. A tire designated generally by the numeral 13 is formed of a coiled spring. The spring in practice is made as diagrammatically shown in Figs. 16 and 17, in which the former figure shows the ends of the convolutions overlapped. The coil is then expanded, as indicated in Fig. 17, and the meeting ends joined. This manner of forming the tire, however, forms no part of the present invention.

Referring particularly to Figs. 1 and 2, it will be seen that the tire 13 is made to conform to the requirements of a car wheel, the coils of the tire being thickened radially as at $13^a$ to present a thickened tread and said coils being formed to constitute a flange $13^b$ on the car wheel.

Spokes 14 are pivotally connected at one end to lugs 15 on the tire, and at the inner ends they are connected to coil springs 16. Said springs 16 are coiled about pins 17, the trunnions of which are received in concaved depressions at the inner sides of lateral lugs 18 on the rim 12. One end of the spring is flattened and carried radially outward as at 19, said arm 19 of each spring being pivotally connected with a link 14. The other end of each spring 16 is formed into an arm 20 which extends radially inward. Associated with the arms 20 are tensioning means to vary the tension of the spring 16. To tension the springs, set screws 21 are provided bearing by their inner ends against the arms 20. The said screws 21 take into threaded holes $22^b$ in rings 22 surrounding the hub 10 so that a turning of the screws will cause the same to advance against or recede from the arms 20. The said rings 22 are formed at their inner faces with lugs $22^d$ between which the arms 20 of adjacent springs 16 are received.

The rings 22 are disposed adjacent to each end of the hub 10, and adjusting screws 23 having right and left threads have threaded engagement with said rings 22 at holes $22^c$ therein. The rings are thickened or formed with bosses $22^a$ adjacent to the holes $22^c$. The screws 23 have collars 24 and set collars 25 secured by set screws 26. The said collars are at opposite sides of the web 11 through which the screws 23 extend parallel to the axis of the hub 10.

In order to resiliently tie the rings 22 to each other and prevent all looseness of the same, transverse springs 27 have their ends 28 in hook form, the hooks being received beneath flanges 29 on the respective rings 22. The set screws 21 and the right and left screws 23 extend through suitable holes in facing plates 30, 31, at opposite sides of the wheel. The facing plates are formed at the outer edges as at 32 to accommodate the springs 16 and their arms 19.

In order that the turning of any one screw 23 by applying a wrench thereto may turn all the said screws, I provide on each screw a pinion 33 and on the hub 34 of the housing plate 31 is a loose ring 35 having an annular series of gear teeth 36, with which pinions 33 mesh. If desired, instead of manually turning one of the screws 23, I may employ a second annular series of gear teeth 37 on the ring 35 meshing with which is a pinion 38 on a shaft 39, which in practice may be turned by any suitable source of power (not shown). The shaft 39 (see Figs. 2 and 12) turns in a bearing 40 yieldingly supported on a spring 41 secured to a frame 42. The spring 41 normally tends to lift the shaft 39 to maintain the pinion 38 out of mesh with the gear teeth 37. To throw the pinion 38 and gear teeth 37 into gear, a lever 44 is fulcrumed as at 43 on a frame 42. Said lever 44 has a fork 45 adapted to bear downwardly on the shaft 39 against the tension of the spring 41 when the lever 44 is rocked. To rock the lever 44, any suitable pull cord or wire, or the like, 46, may be employed.

The turning of the screws 23 by drawing the rings 22 toward each other will cause the ends of the screw 21 to bear against the arms 20 of the springs 16, thereby tensioning the spokes 14; in addition, the individual screws 21 may be utilized to tension individual spokes 14.

On one screw 23 is a locking pinion 47 adjacent to which is a dog or lock 48 which is secured to the web 11 and adapted to spring into engagement with the said pinion, whereby to hold the adjacent screw 23 against turning. To release the dog 48, a key 49 (Figs. 6 and 11) is employed.

Between the lugs 15 a series of stays 50 are provided disposed in annular series around the rim 12. The outer end of each stay is pivotally secured to a lug 51 on the tire 13. The opposite end of each stay is secured to spring 52 which is coiled around a pin 53 in a bracket 54 secured rigidly to the rim 12. In order to tension the stays, the end of the spring 52 opposite each stay is formed into an arm 55, best seen in Figs. 7 and 9. The arm 55 is formed with a hole 56 to receive a tensioning bolt or screw 57 which extends radially through the rim 12.

In Fig. 13 the tire 13$^d$ is round in cross-section, to suit a road vehicle. For the most part the wheel shown in Fig. 13 is similar to that previously described, there being spokes 14 under the influence of springs 16 having arms 19, 20, as previously referred to. I have shown in this figure, however, right and left screws 23$^a$ extending through the described rings 22 and through the web 11$^a$ of the hub section 10$^a$. On the screws are pinions 33$^a$ with a ring gear 35$^a$ loosely supported on lugs 11$^b$ on the web 11$^a$, so the screws 23$^a$ are geared together. A similar locking pinion 47 and latch dog 48 are employed. The wheel shown in Fig. 13 has any suitable housing plates 30$^a$ on the faces thereof, which have formations 32$^a$ to accommodate the spring 16 and arms 19, and otherwise formed to receive the screws 21, 23$^a$. It is understood that the respective housing plates may be secured in any suitable manner, as by screws 58. The several housing plates are flanged over the lateral lugs 18 of the rim 12 and may be fastened thereto by screws 59 (see Fig. 15).

Having thus described my invention, what I claim as new and desire to secure by Letters Patent, is:

1. In a spring wheel, a hub section, a tire, and means to resiliently support the tire, said means comprising spokes connected at their outer ends with the tire, coiled springs disposed in annular series about the wheel, rings at the opposite sides of the wheel, and movable to and from each other, the said springs having at one end arms connected with the spokes, and having at the opposite end arms exerting pressure against the rings and movable by the latter to vary the tension of the springs, and means to move said rings.

2. A spring wheel comprising a hub section, a tire, spokes connected at their outer ends with the tire, coiled springs each having at one end an arm connected with a spoke, the springs having arms also at the opposite ends, rings on the hub section movable toward and from each other, means for moving said rings, and set screws on the rings bearing against the second mentioned arms of the springs.

3. In a spring wheel, a hub section, a tire, spokes connected at their outer ends with a tire, rings movable on the hub section toward and from each other, coiled springs having an arm at one end connected with a spoke, said springs having arms at the opposite ends subject to the movements of the rings to vary the tension of the springs, screws having right and left threads engaging said rings to move the latter, said screws being geared together, and means whereby the screws may be turned.

4. In a spring wheel, a hub section having a rim, a tire, spokes connected at one end with the tire, means resiliently supporting the spokes on the hub section, stays disposed in an annular series on the rim beneath the tire and connected at one end with the tire, coiled springs on the rim having arms to which the opposite ends of the stays are connected, each spring terminating at the opposite end in a tensioning arm, and screws disposed radially in the rim and engaging the said tensioning arms of the springs.

In testimony whereof I have signed my name to this specification in the presence of two subscribing witnesses.

GEORGE JOSEPH MURPHY.

Witnesses:
ELI TAYLOR,
CHARLES WISAR.